(12) United States Patent
Bovard et al.

(10) Patent No.: US 10,867,332 B2
(45) Date of Patent: Dec. 15, 2020

(54) METHOD OF PERSONALIZING AND MERCHANDISING CASKETS AT POINT OF PURCHASE

(71) Applicant: Batesville Services, Inc., Batesville, IN (US)

(72) Inventors: Christopher C. Bovard, Sunman, IN (US); Paul Holzman, Mason, OH (US); Daniel G. Meiser, Wilder, KY (US); Ilija Rojdev, Cincinnati, OH (US); Christopher M. Wessel, Metamora, IN (US)

(73) Assignee: Batesville Services, Inc., Batesville, IN (US)

( * ) Notice: Subject to any disclaimer, the term of this patent is extended or adjusted under 35 U.S.C. 154(b) by 199 days.

(21) Appl. No.: 16/176,914

(22) Filed: Oct. 31, 2018

(65) Prior Publication Data
US 2019/0066179 A1 Feb. 28, 2019

Related U.S. Application Data

(62) Division of application No. 13/743,809, filed on Jan. 17, 2013, now abandoned.
(Continued)

(51) Int. Cl.
*G06Q 30/06* (2012.01)
*G06Q 90/00* (2006.01)
(Continued)

(52) U.S. Cl.
CPC ......... *G06Q 30/0621* (2013.01); *A61G 17/00* (2013.01); *A61G 17/042* (2016.11); *G06Q 90/00* (2013.01); *G06Q 99/00* (2013.01)

(58) Field of Classification Search
CPC ...... A61G 17/042; A61G 17/04; A61G 17/00; A61G 17/001; A61G 17/004;
(Continued)

(56) References Cited

U.S. PATENT DOCUMENTS 3,191,320 A 6/1965 Copeland
4,312,104 A * 1/1982 Baker .................. A61G 17/042
27/19
(Continued)

OTHER PUBLICATIONS

Bedding Terms—BeddingStyle.com, www.beddingstyle.com/content/bedding-terms.asp, 3 pages, definition of "Bed-in-a-Bag," a product in public use and on sale in the US more than one year prior to Jan. 17, 2012.

*Primary Examiner* — William L Miller
(74) *Attorney, Agent, or Firm* — Wood Herron & Evans LLP

(57) ABSTRACT

A method of merchandising caskets by a casket seller at the point of purchase of a casket purchaser comprises displaying a plurality of untrimmed caskets from which the purchaser may select, each casket of the plurality of caskets being of a different material, color, or design, displaying a plurality of packaged casket interior trim component sets from which the purchaser may select, each set of the plurality of sets containing trim components being of a different material, color, or design, and installing the casket interior trim components of the purchaser selected set into the purchaser selected casket. The casket interior components can include one or more, or all, of a mattress cover, a pillow cover, a big body, a small body, and an overthrow, in any combination.

10 Claims, 12 Drawing Sheets

Related U.S. Application Data

(60) Provisional application No. 61/587,256, filed on Jan. 17, 2012.

(51) Int. Cl.
 *A61G 17/00* (2006.01)
 *G06Q 99/00* (2006.01)
 *A61G 17/04* (2006.01)

(58) Field of Classification Search
 CPC ........... A61G 17/0073; G06Q 30/0621; G06Q 90/00; G06Q 99/00
 USPC .............................. 27/2, 4, 19, 35; 705/26.5
 See application file for complete search history.

(56) References Cited

U.S. PATENT DOCUMENTS

| | | | |
|---|---|---|---|
| 5,073,320 A | 12/1991 | Sterzel | |
| 5,405,017 A | 4/1995 | Szabo, Sr. et al. | |
| 5,524,394 A | 6/1996 | Szabo, Sr. et al. | |
| 5,709,016 A | 1/1998 | Gulick et al. | |
| 5,709,052 A | 1/1998 | Szabo, Sr. et al. | |
| 5,775,061 A | 7/1998 | Enneking et al. | |
| 5,848,498 A | 12/1998 | Szabo, Sr. et al. | |
| 6,154,937 A | 12/2000 | Enneking et al. | |
| 6,202,270 B1 | 3/2001 | Bowman et al. | |
| 6,301,758 B1 | 10/2001 | Biondo et al. | |
| 6,317,944 B1 * | 11/2001 | Beaulieu | A61G 17/004 27/4 |
| 6,543,103 B1 * | 4/2003 | Robert | A61G 17/001 27/10 |
| 6,557,221 B2 | 5/2003 | Cox et al. | |
| 6,571,440 B1 | 6/2003 | Faulkner et al. | |
| 6,574,840 B1 * | 6/2003 | Doppel | A61G 17/042 27/2 |
| 6,742,231 B1 | 6/2004 | Calhoun et al. | |
| 6,745,442 B2 | 6/2004 | Biondo et al. | |
| 7,036,196 B2 | 5/2006 | Salatin et al. | |
| 7,107,222 B1 | 9/2006 | Riga | |
| 7,520,395 B2 | 4/2009 | Bowers et al. | |
| 7,798,337 B2 | 9/2010 | Gard et al. | |
| 7,891,505 B2 | 2/2011 | Bowers et al. | |
| 7,954,653 B2 | 6/2011 | Adams et al. | |
| 7,992,727 B2 | 8/2011 | Gard et al. | |
| 8,091,713 B2 | 1/2012 | Bowers et al. | |
| 8,196,275 B2 | 6/2012 | Wessel | |
| 10,500,117 B2 * | 12/2019 | Davis | A61G 17/034 |
| 2002/0004972 A1 * | 1/2002 | Michaud | A61G 17/004 27/4 |
| 2002/0148084 A1 | 10/2002 | Bell et al. | |
| 2004/0158960 A1 | 8/2004 | Shaw | |
| 2005/0022348 A1 | 2/2005 | Parker et al. | |
| 2005/0045499 A1 | 3/2005 | Bisbal et al. | |
| 2005/0081348 A1 | 4/2005 | Cunningham et al. | |
| 2005/0204525 A1 * | 9/2005 | Wray | A61G 17/041 27/20 |
| 2005/0268440 A1 | 12/2005 | Bovard et al. | |
| 2007/0065049 A1 | 3/2007 | Alldredge-Howard et al. | |
| 2009/0030804 A1 | 1/2009 | Sell | |
| 2013/0191239 A1 * | 7/2013 | Bovard | G06Q 99/00 705/26.5 |
| 2019/0015282 A1 * | 1/2019 | Reynolds | A61G 17/042 |
| 2020/0146920 A1 * | 5/2020 | Davis | A61G 17/001 |

* cited by examiner

METHOD OF PERSONALIZING AND MERCHANDISING CASKETS AT POINT OF PURCHASE

RELATED APPLICATIONS

This application is a divisional of U.S. patent application Ser. No. 13/743,809 filed Jan. 17, 2013, which claims the priority benefit of U.S. Provisional Patent Application No. 61/587,256 filed Jan. 17, 2012, both of which are hereby incorporated by reference herein as if fully set forth in their entirety.

FIELD OF THE INVENTION

This invention relates generally to caskets, and more particularly to personalizing and merchandising caskets at the point of purchase.

BACKGROUND OF THE INVENTION

A conventional casket has a casket shell adapted to receive the remains of a deceased, and either a single lid or cap, or pair of lids or caps, pivoted to the shell. Single lid caskets are sometimes referred to as "full top" or "full couch" caskets, whereas caskets with separate head end and foot end lids are sometimes referred to as "split top" or "half couch" caskets. During viewing of a body in a split top casket, only the head end cap is raised, while during viewing of a body in a full top casket, the single full length cap is of course raised. In either instance, the interior of the casket is visible. It has heretofore been conventional to trim the interior of the casket with various decorative interior trim components to present an ornamentally pleasing appearance when the lid or lids is or are open.

In the case of so-called split top caskets, during viewing the head end lid is opened and the foot end lid remains closed. Decorative trim components are provided for the casket shell interior. For example, a decorative fabric mattress cover overlies the mattress on the body support structure mounted in the casket shell. A decorative fabric "big body" overlies the rim of the shell and extends into the interior of the shell and over a portion of the exterior of the shell. The big body extends from the head end of the closed foot end lid along the head end portion of the front side wall of the shell, around the front head end corner of the shell, and along the head end end wall of the shell. A decorative fabric "small body" overlies the rim of the shell and extends into the interior of the shell and extends from the head end of the closed foot end lid along the head end portion of the rear side wall of the shell to the head end end wall of the shell. A decorative fabric "overthrow" extends over the head end of the closed foot end lid and into the interior of the shell. A pillow with decorative fabric cover is placed on the mattress at the head end thereof. In the case of so-called full top caskets, the big body is a full length big body and extends along the head end end wall, entire front side wall, and foot end end wall of the shell, and the small body is a full length small body and extends from the head end end wall to the foot end end wall along the entire rear side wall of the shell.

Decorative trim components can also be provided for the underside of the casket lid, visible when the lid is open. A "dish assembly" is typically mounted within the underneath side of the lid. The dish assembly includes a generally rectangular cap panel and four convexedly shaped "puffing members" mounted around the periphery of the cap panel to the opposed longer sides and the opposed shorter ends of the cap panel. The dish assembly may or may not include a decorative cap panel insert that is removably installable between the four puffing members of the dish assembly. The cap panel and/or cap panel insert may be covered in decorative fabric or otherwise have ornamentation applied thereto which complements the fabric design used for the big body, small body, overthrow, mattress cover, and pillow cover. A split top casket will typically have a dish assembly mounted in both the head end lid and the foot end lid, although typically only the head end lid will have decorative adornments with the foot end dish assembly being plain or basic. A full top casket will have a single dish assembly the full length of the casket, with or without additional decorative adornments.

Currently, in the manufacture of caskets, the casket is almost entirely or completely trimmed or dressed at the manufacture's location prior to shipment to the point of sale/point of purchase, for example funeral home, and thus only a limited degree of personalization is available to the casket purchaser at the time of purchase at the point of purchase. For example, various decorative casket shell corner ornaments can be selected by the purchaser to personalize the casket to the deceased. Such corner ornaments are installed on the casket shell corners by, for example, the funeral director at the funeral home at the time of purchase. As another example, various decorative cap panel inserts can be selected by the purchaser to personalize the casket to the deceased. Such cap panel inserts are also installed into the dish assembly by, for example, the funeral director at the funeral home at the time of purchase. As yet another example, various decorative medallions can be selected by the purchaser to personalize the casket to the deceased, which can be attached to the interior and/or the exterior of the casket shell and/or casket lid at the point of purchase.

It is desirable to make available to the casket purchaser additional opportunities to personalize the casket to the deceased.

It is also desirable to provide funeral directors with improved methods of merchandising caskets at the point of purchase.

It is also desirable to provide casket manufacturers with improved methods of shipping caskets.

SUMMARY OF THE INVENTION

In one aspect, a method of merchandising caskets by a casket seller at the point of purchase of a casket purchaser is provided. The method comprises displaying a plurality of untrimmed caskets from which the purchaser may select, each casket of the plurality of caskets being of a different material, color, or design, displaying a plurality of packaged casket interior trim component sets from which the purchaser may select, each set of the plurality of sets containing trim components being of a different material, color, or design, and installing the casket interior trim components of the purchaser selected set into the purchaser selected casket.

Each of the plurality of packaged casket interior trim component sets may be packaged in a container that is at least in part transparent to permit the purchaser to view the trim components through the container. The casket interior components of each packaged set can include one or more, or all, of a mattress cover, a pillow cover, a big body, a small body, and an overthrow, in any combination. The casket interior components of each packaged set can further include one or more, or all, of a throw pillow, a cap panel accent, a puffing accent, a comforter, a cap panel, and a foot lining.

The small body can be a one-piece small body and foot lining. The big body, small body, and mattress cover can be sewn together as a single one-piece unit.

In another aspect, a method of personalizing a casket by a casket purchaser at the point of purchase of the casket purchaser is provided. The method comprises selecting a casket from a plurality of untrimmed caskets, each casket of the plurality of caskets being of a different material, color, or design, selecting a packaged casket interior trim component set from a plurality of sets, each set of the plurality of sets containing trim components being of a different material, color, or design, and directing that the casket interior trim components of the selected set be installed into the selected casket.

In another aspect, a method of shipping a casket in an untrimmed state for trimming at a destination is provided. The method comprises packaging each of a plurality of casket interior trim component sets in a respective container, each set of the plurality of sets containing trim components being of a different material, color, or design, placing the plurality of containers of trim components in the untrimmed casket, and shipping the untrimmed casket with the plurality of containers of trim components therein to the destination.

In another aspect, a packaged casket interior trim component set for installation into an untrimmed casket is provided. The packaged casket interior trim component set comprises a container that is at least in part transparent, and a set of casket interior trim components packaged in the container, the casket interior trim components including three, or more, or all of a mattress cover, a pillow cover, a big body, a small body, and an overthrow, in any combination. The packaged casket interior trim component set can further comprise one or more, or all, of a throw pillow, a cap panel accent, a puffing accent, a comforter, a cap panel, and a foot lining.

The accompanying drawings, which are incorporated in and constitute a part of this specification, illustrate embodiments of the invention and, together with the summary of the invention given above, and the detailed description of the drawings given below, serve to explain the principles of the present invention.

DETAILED DESCRIPTION OF THE DRAWINGS

Figure 1:
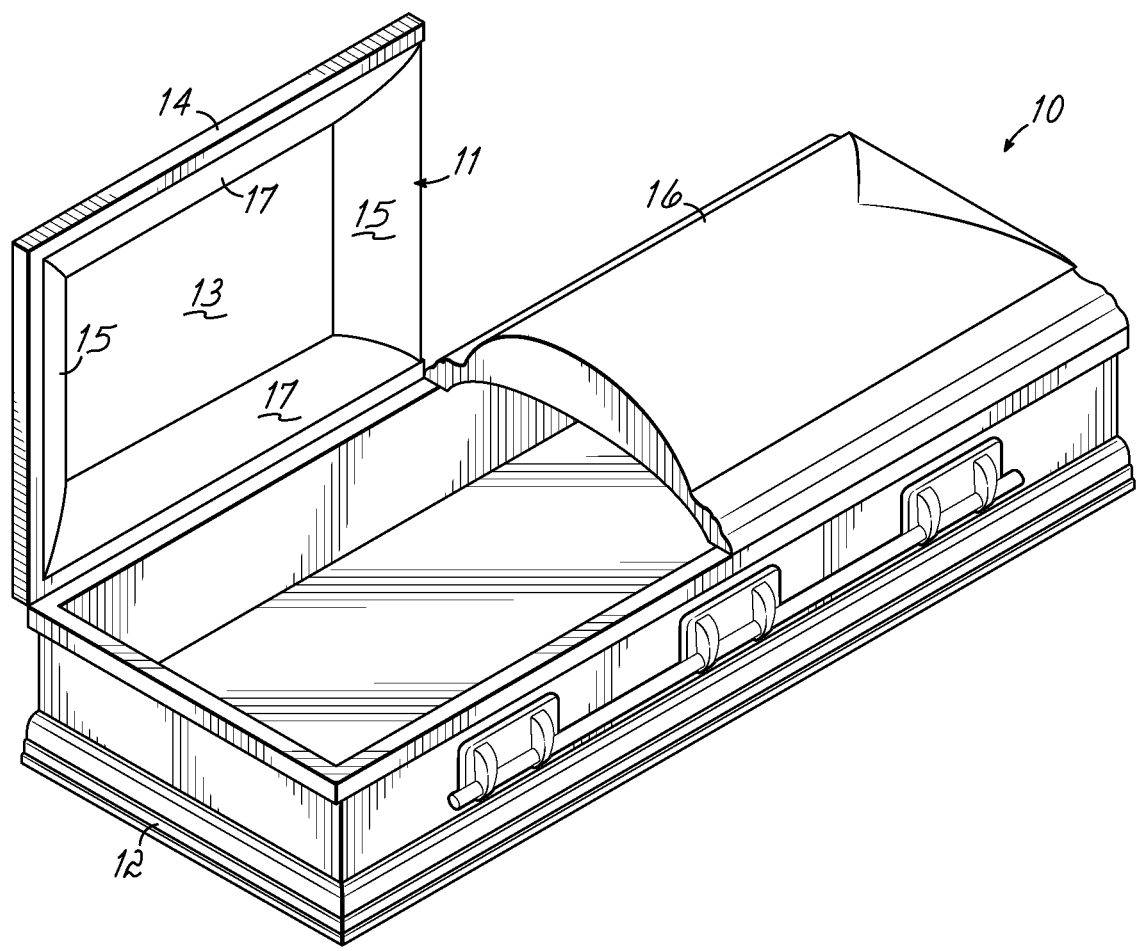
FIG. 1 is an perspective view of an untrimmed casket.

Referring first to FIG. 1, there is illustrated an untrimmed casket 10. Casket 10 comprises a shell 12, and either a single full length lid, or as illustrated a pair of lids in the form of a head end lid 14 and foot end lid 16, pivoted to the shell 12. The casket 10 in its untrimmed state may or may not include a dish assembly 11 installed in the underneath side of one or both of the lids 14, 16 comprising a generally rectangular cap panel 13 and opposed puffing members 15, 15 and 17, 17 mounted to the shorter ends and longer sides, respectively, of the cap panel 13.

Figure 2:
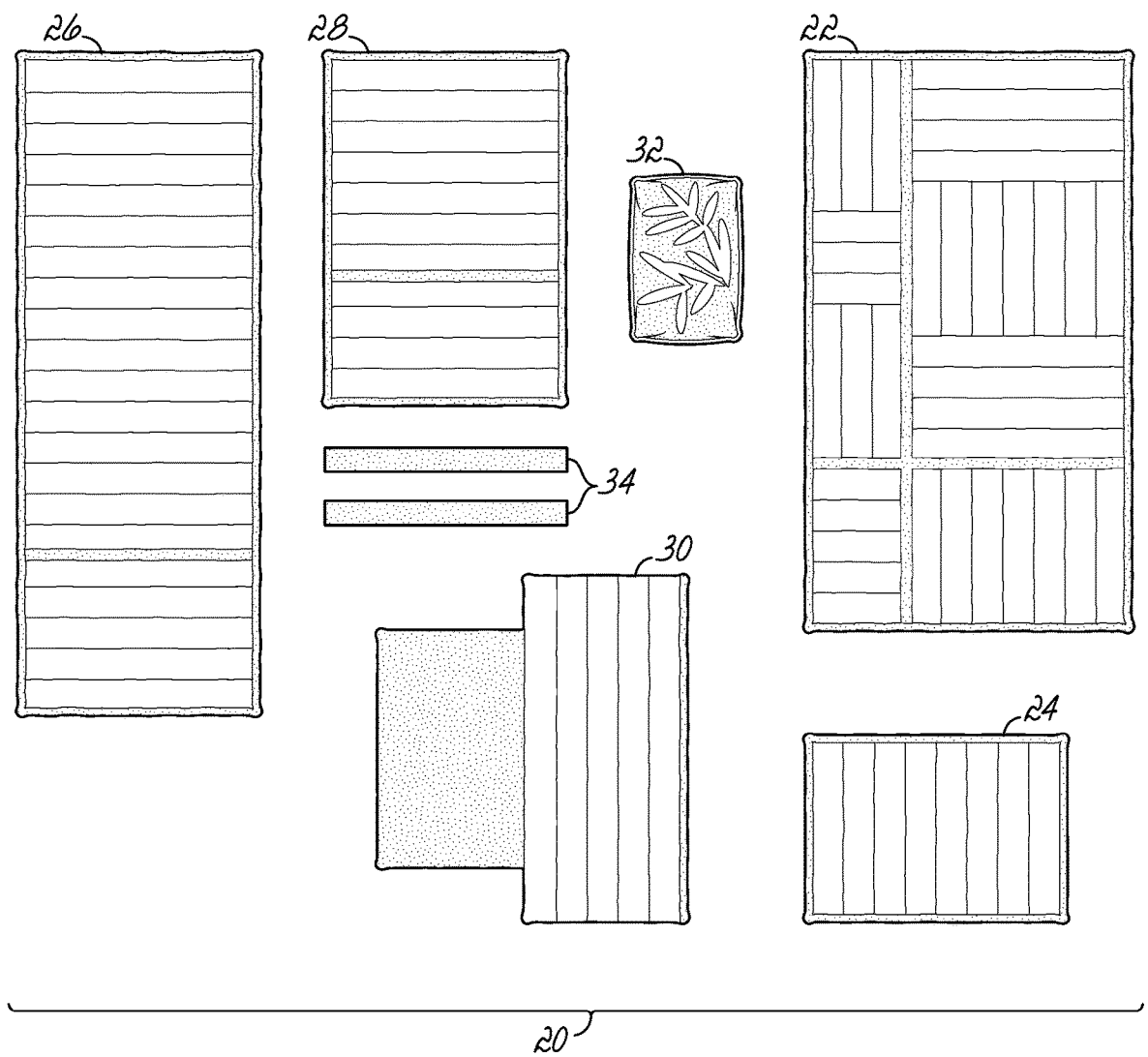
FIG. 2 is a top plan view of various decorative trim components of a first design for installation into the casket interior.

Referring now to FIG. 2, there is illustrated an exemplary first set 20 of casket interior trim components. The trim component set 20 can include a mattress cover 22, a pillow case or cover 24, a big body 26, a small body 28, and an overthrow 30. Additionally and/or optionally, the trim component set 20 can include an accent or throw pillow 32 and cap panel accents 34. The trim components of the first trim component set 20 can be made of any number of materials, in any number of colors, and include any number of designs.

Figure 3:
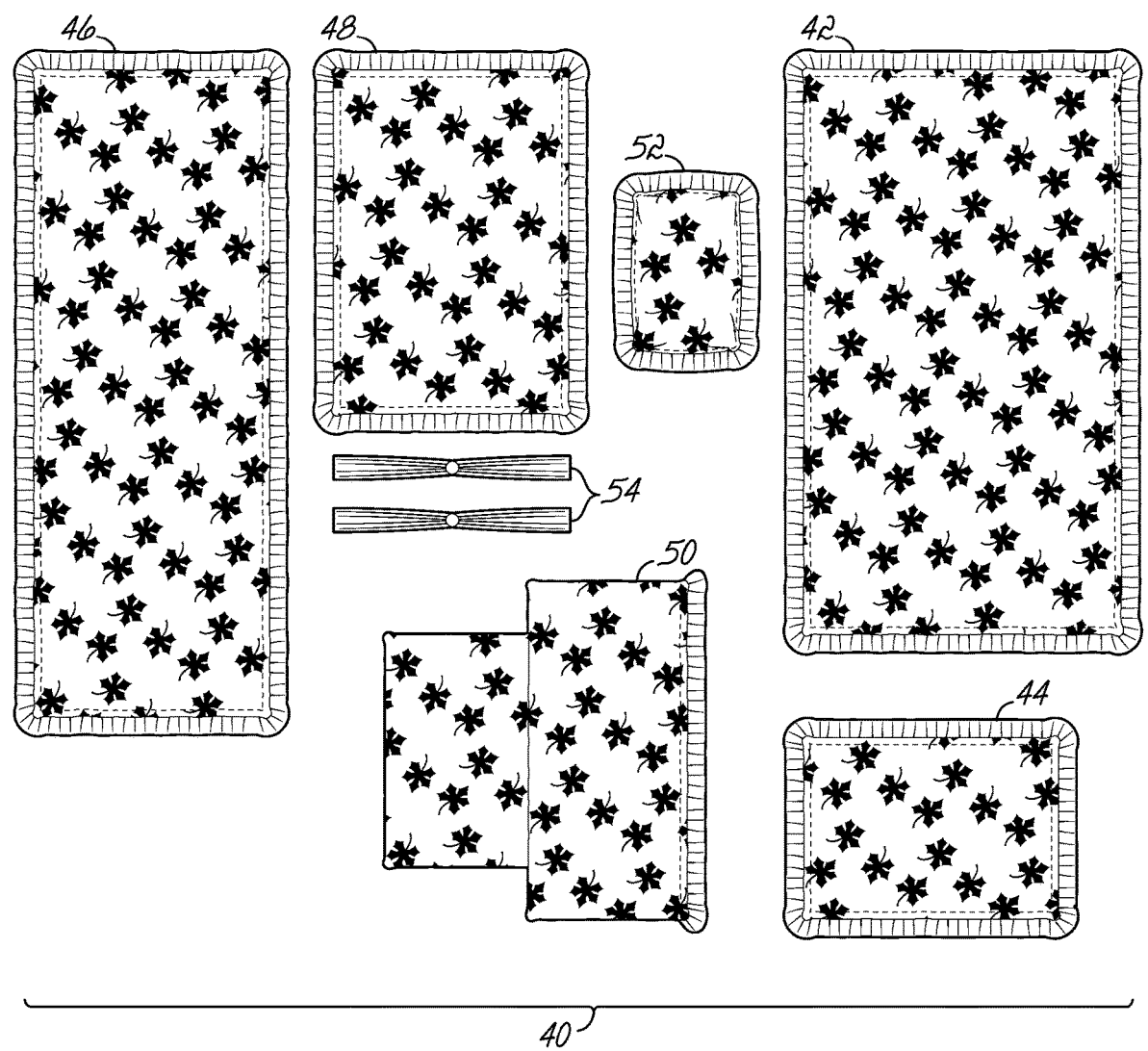
FIG. 3 is a top plan view of various decorative trim components of a second design for installation into the casket interior.

Referring now to FIG. 3, there is illustrated an exemplary second set 40 of casket interior trim components. The trim component set 40 can also include a mattress cover 42, a pillow case or cover 44, a big body 46, a small body 48, and an overthrow 50. Additionally and/or optionally, the trim component set 40 can also include an accent or throw pillow 52 and cap panel accents 54. The trim components of the second trim component set 40 can also be made of any number of materials, in any number of colors, and include any number of designs, and as illustrated, are different than the trim components of the first trim component set 20. The trim component sets 20 and 40 are merely illustrative examples of the types of casket interior trim components that can be installed in the casket 10. In the practice of the invention, a casket seller, for example funeral director at a funeral home, would preferably have on hand several more styles/designs of trim component sets for a casket purchaser to select from.

Figure 4:
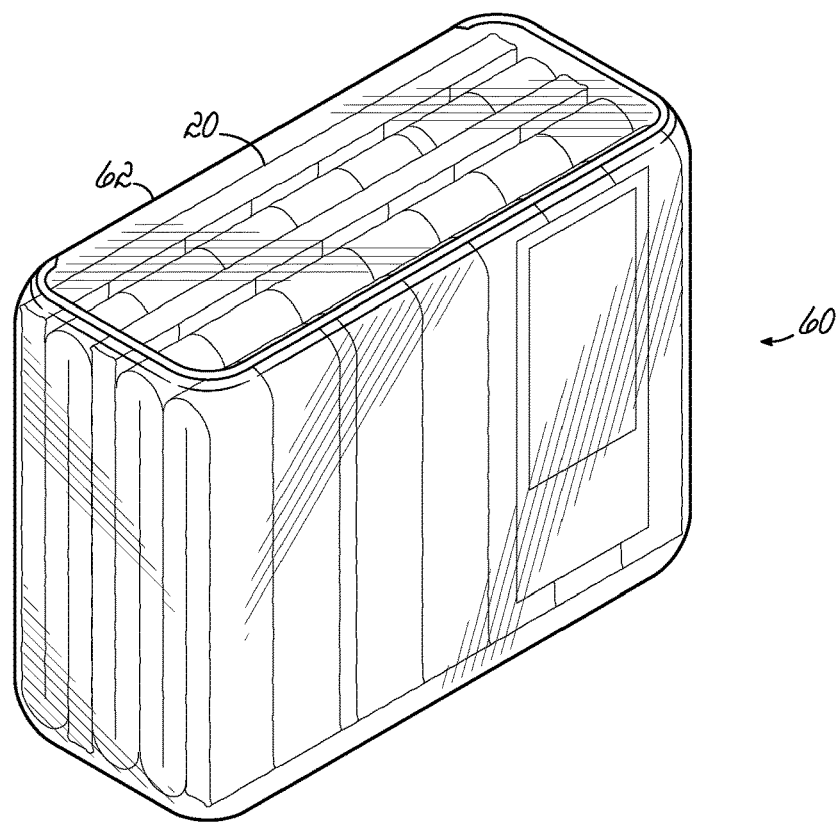
FIG. 4 is a perspective view of the trim components of FIG. 2 packaged for shipment to the funeral home and for display to a customer of the funeral home.
Figure 5:
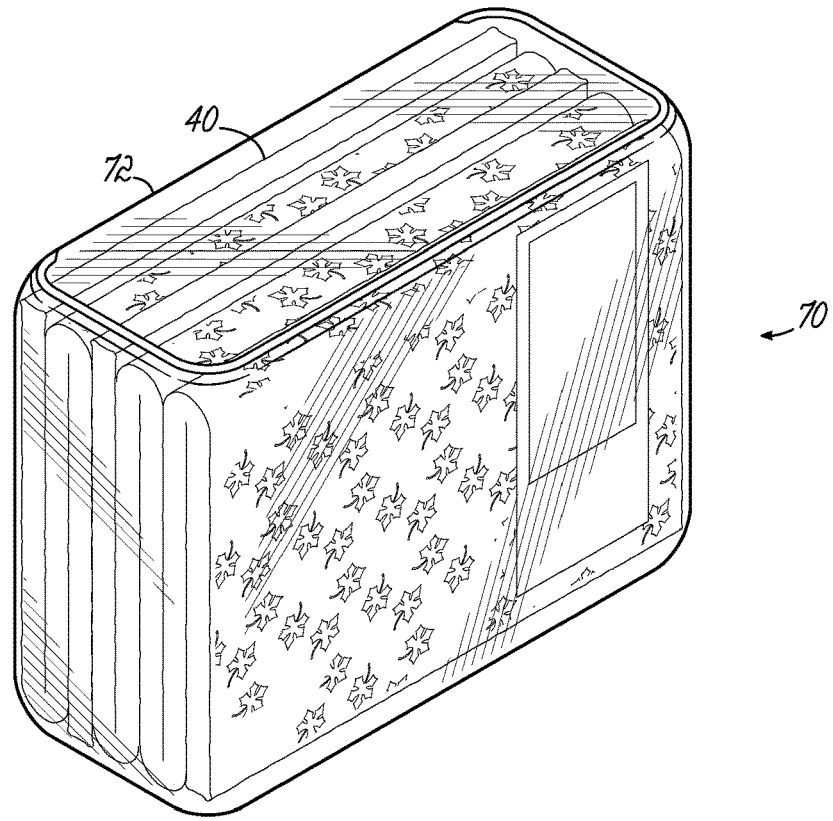
FIG. 5 is a perspective view of the trim components of FIG. 3 packaged for shipment to the funeral home and for display to a customer of the funeral home.

Referring now to FIG. 4, a first packaged trim component set 60 is illustrated. The first packaged set 60 includes the trim component set 20 within a container 62, for example zipper bag at least a portion or all of which is transparent to permit a purchaser to view the trim component set 20 through the container 62. Referring now to FIG. 5, a second packaged trim component set 70 is illustrated. The second packaged set 70 includes the trim component set 40 within a container 72, again for example zipper bag at least a portion or all of which is transparent to permit a purchaser to view the trim component set 20 through the container 62. The containers 62 and 70 can also include an illustration and/or photo of all of the trim components contained in the container installed into a casket for viewing by a purchaser.

Figure 6:
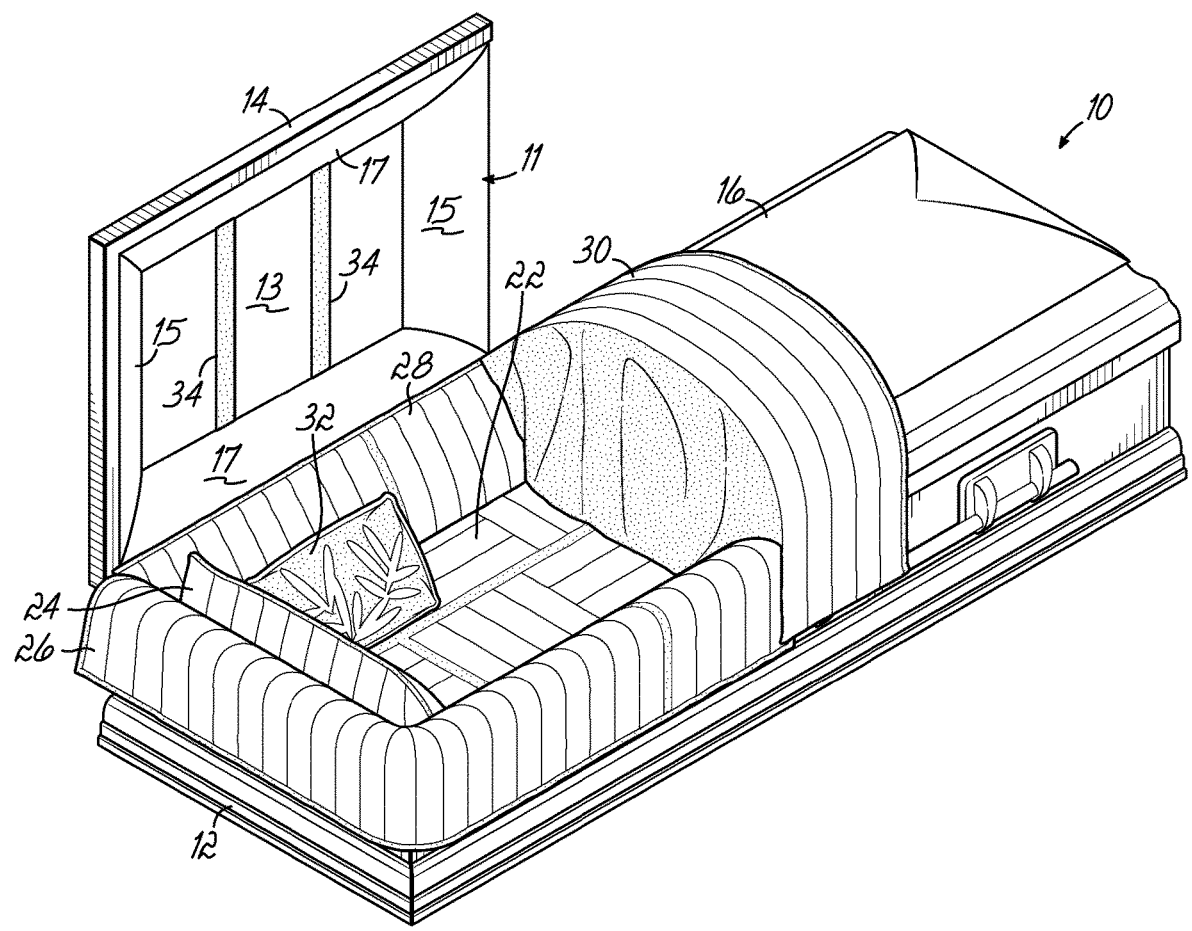
FIG. 6 is a perspective view of the casket of FIG. 1 trimmed with the trim components of FIG. 2.
Figure 7:
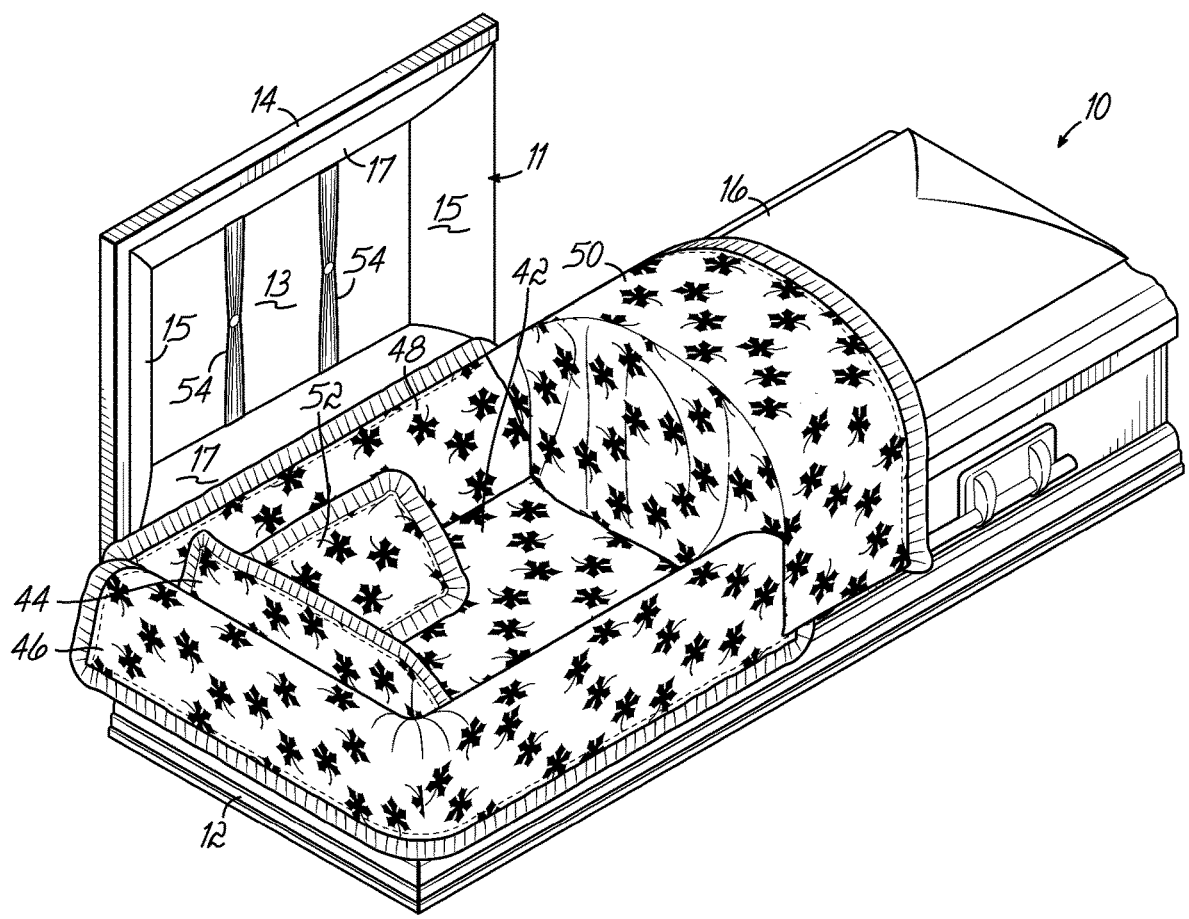
FIG. 7 is a perspective view of the casket of FIG. 1 trimmed with the trim components of FIG. 3.

In the practice of one aspect of the invention, the casket seller, for example funeral director of a funeral home, typically displays a number of untrimmed caskets from which the purchaser may select, with each casket being fabricated of a different material, or being of a different color, or having a different external overall configuration. The casket seller also displays a number of packaged trim component sets from which the purchaser may select. Typically the purchaser would select a casket and then select a trim component set to be installed in the casket. The funeral director then installs the selected trim component set in the selected casket at the purchaser's direction. For example, if the purchaser selects the casket 10 and first trim component set 20, the trim component set 20 installed in the casket 10 presents the appearance as shown in FIG. 6. As another example, if the purchaser selects the casket 10 and the second trim component set 40, the trim component set 40 installed in the casket 10 presents the appearance as shown in FIG. 7. The invention thus provides both a method of merchandising caskets and various combinations of casket interior trim component sets at the point of purchase, and at the same time providing a purchaser with the ability to personalize a selected casket with a selected trim component set. Note that while only two variations of trim component sets have been illustrated, a funeral director would likely have on hand for display more than two such trim component sets for selection by a purchaser. Only two such trim component sets, however, have been shown in the drawings for sake of simplicity.

Figure 8:
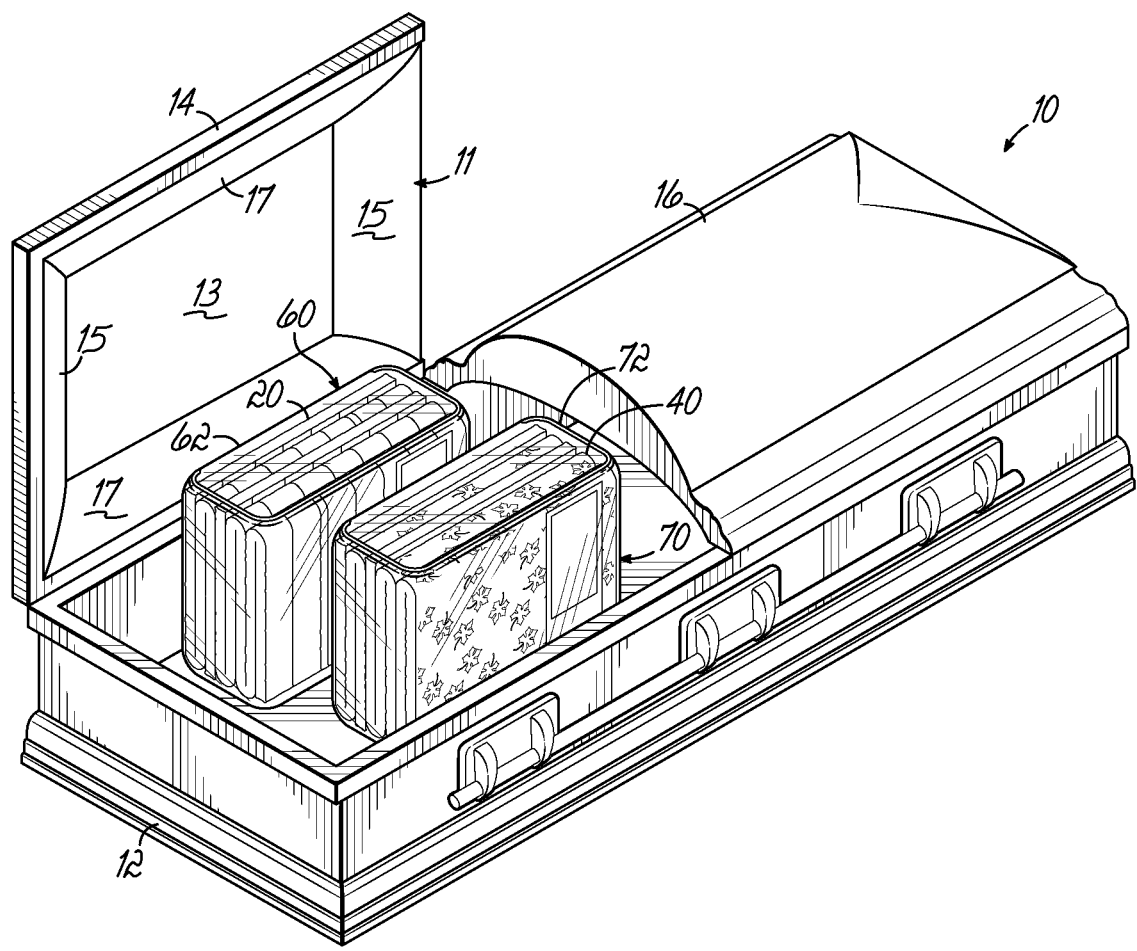
FIG. 8 is a perspective view of the untrimmed casket of FIG. 1 with the packaged trim components of FIGS. 2 and 3 placed therein for shipping.

Referring now to FIG. 8, and in another aspect of the invention, an untrimmed casket 10 can be shipped with a plurality of packaged casket interior trim component sets 60, 70 in the casket 10. In this way, upon arrival at the shipping destination, for example at a funeral home, each untrimmed casket 10 already has a number of different sets of casket interior trim components associated with it to readily and immediately permit the display and selection of same.

Figure 9:
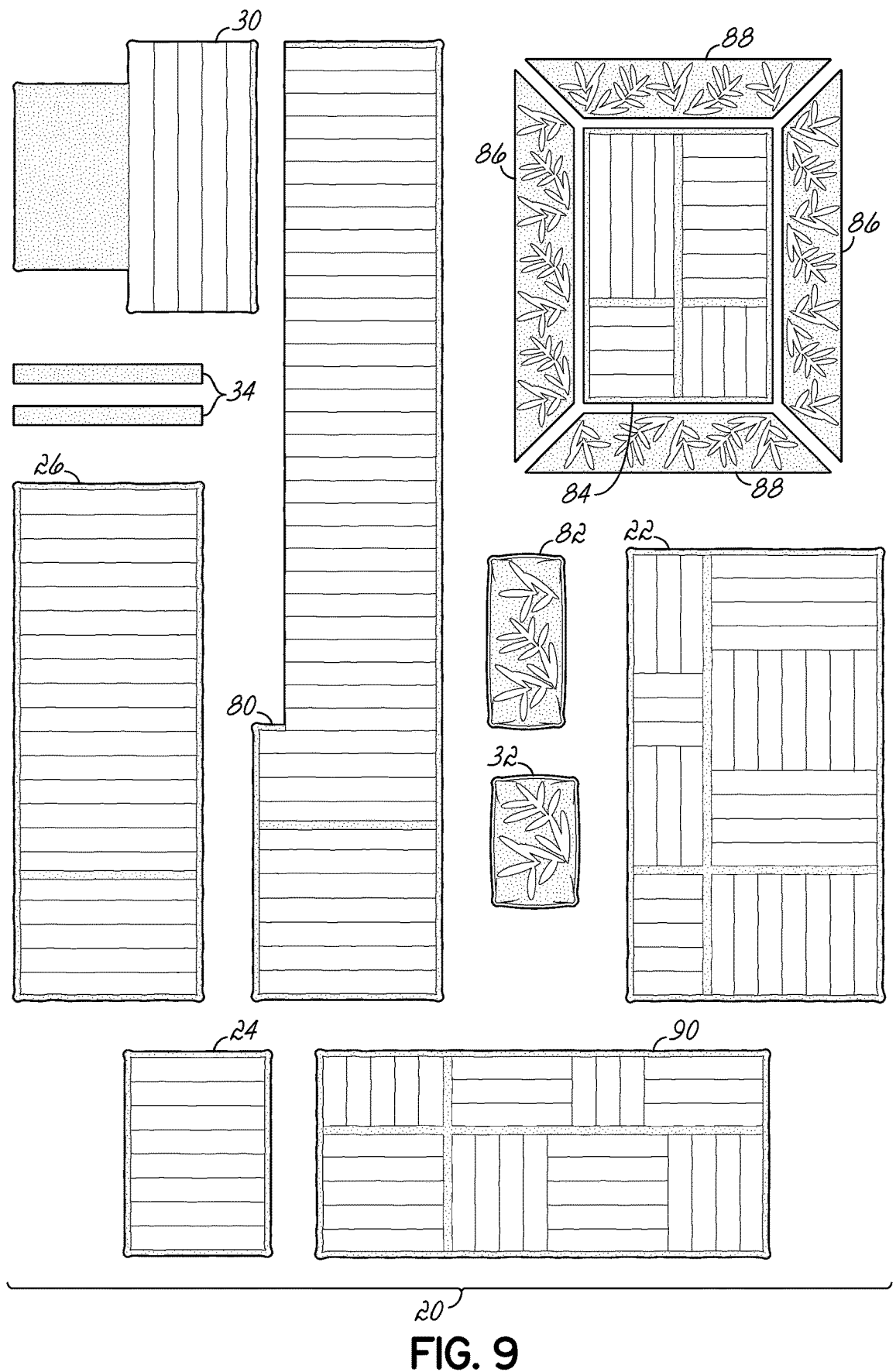
FIG. 9 is a view similar to FIG. 2 illustrating additional decorative trim components of the first design for installation into the casket interior.
Figure 10:
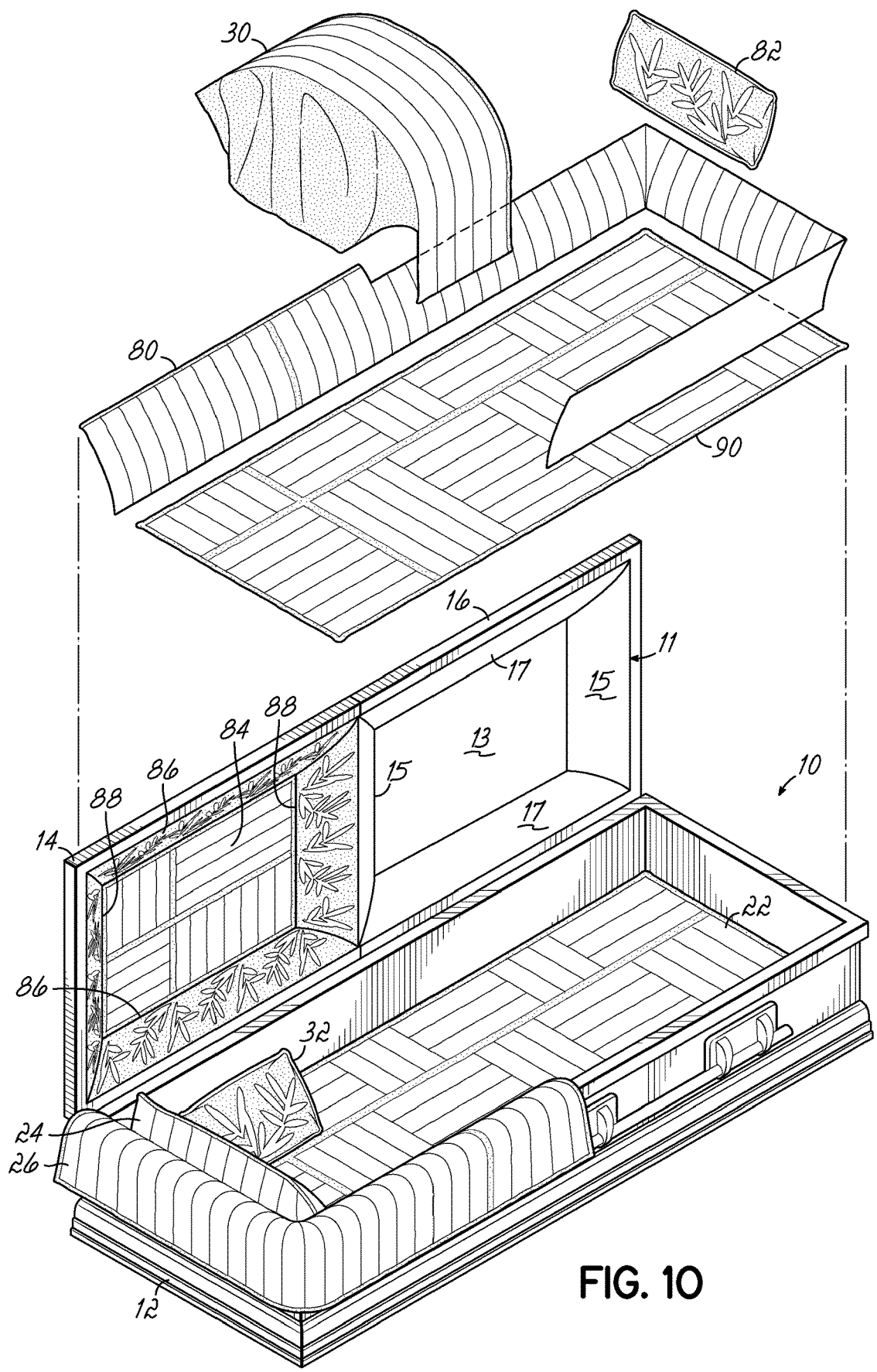
FIG. 10 is a disassembled perspective view of the casket of FIG. 1 trimmed with the trim components of FIG. 9.
Figure 11:
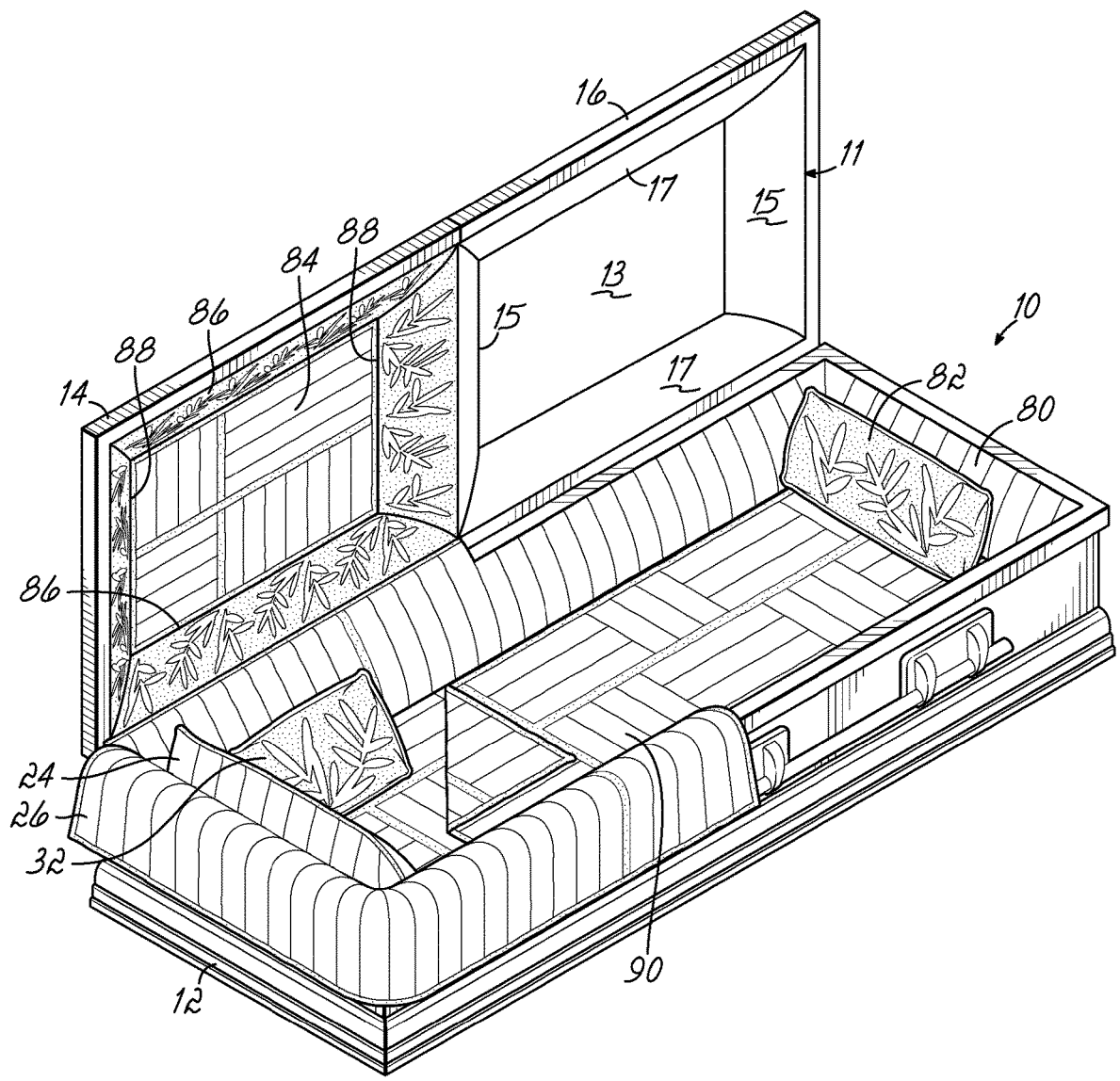
FIG. 11 is an assembled perspective view of the casket of FIG. 1 trimmed with the trim components of FIG. 9.
Figure 12:
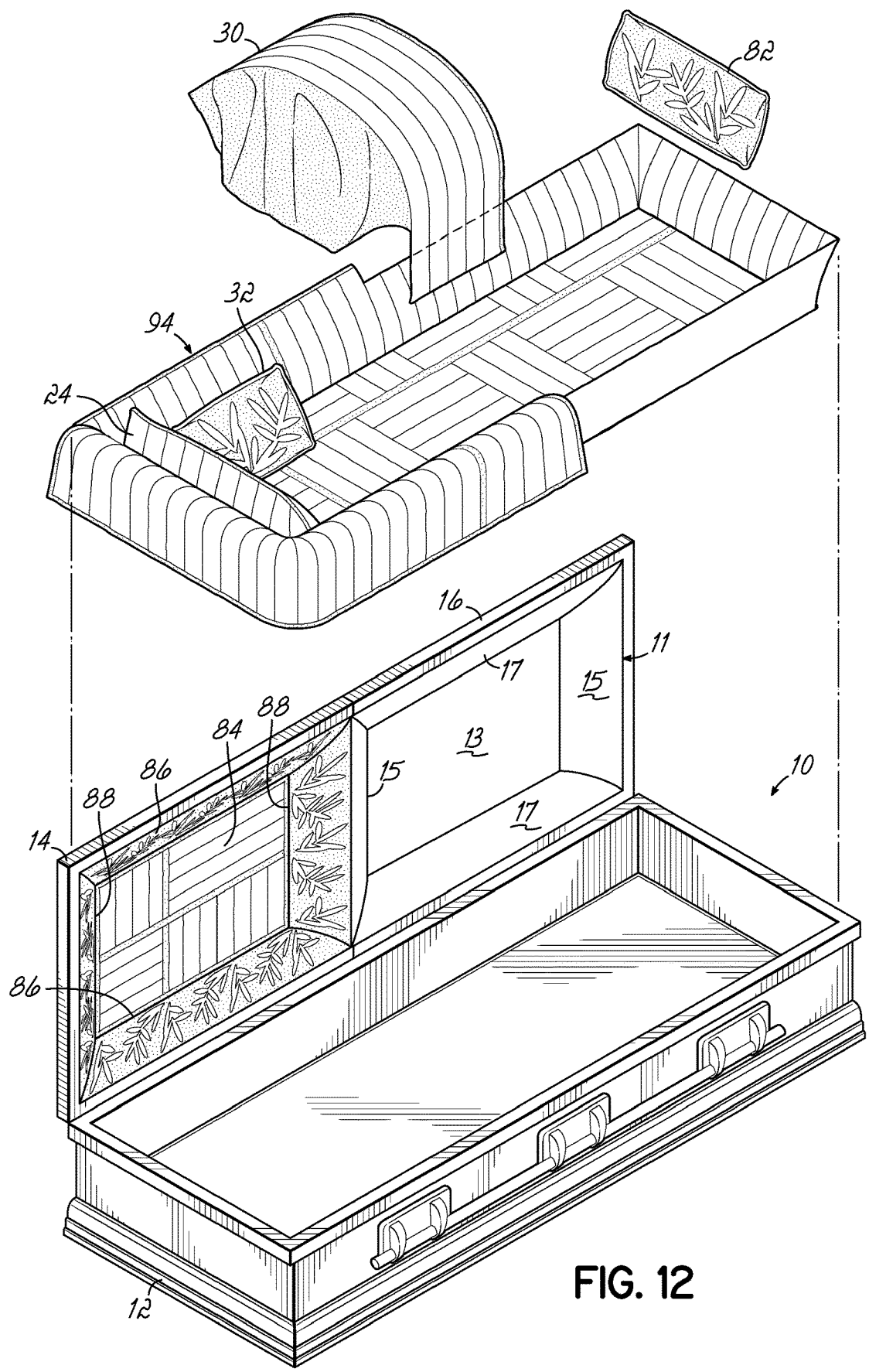
FIG. 12 is a perspective view of a big body, one-piece small body and foot lining, and mattress cover sewn together as a single, one-piece drop in unit.
Figure 13:
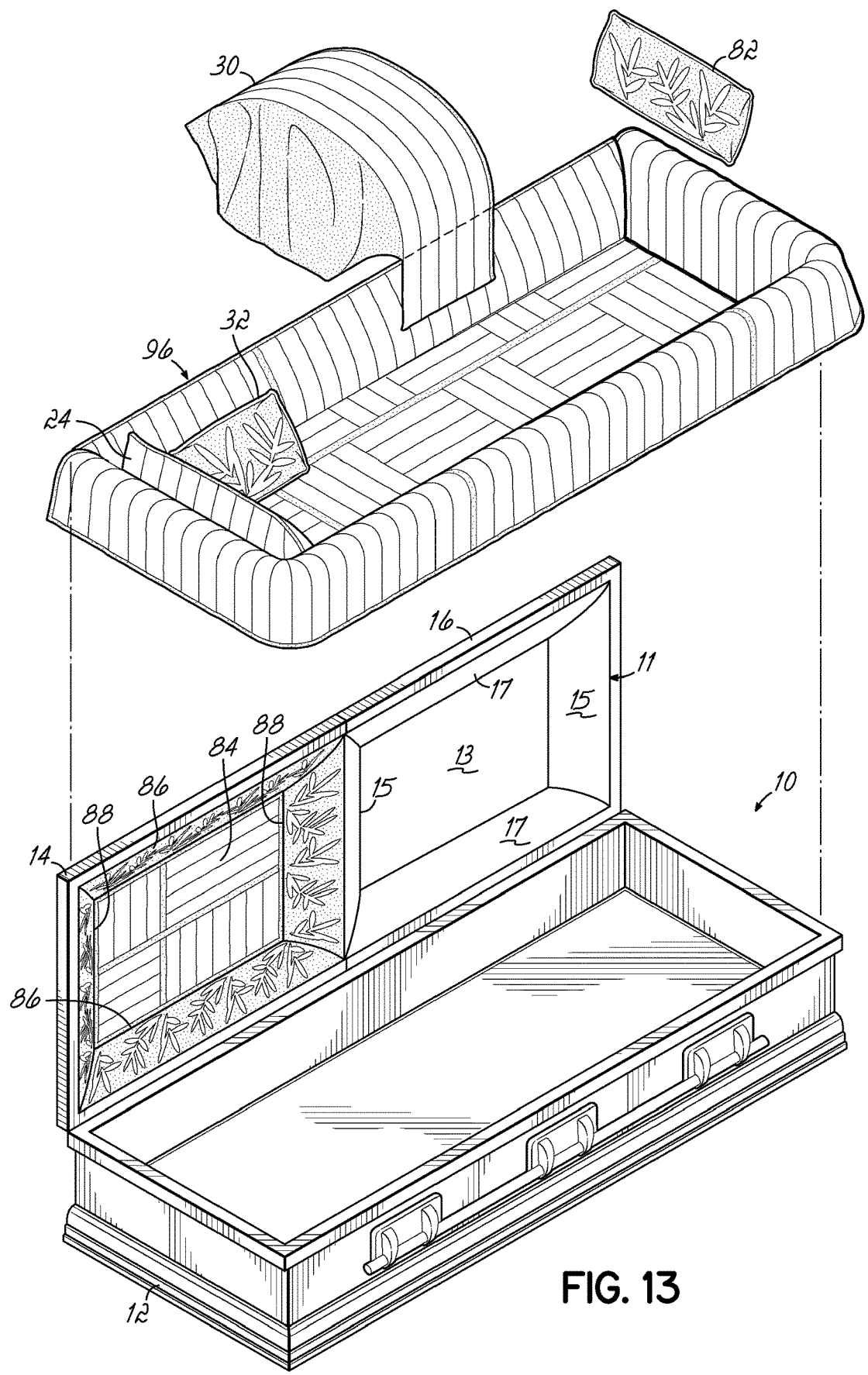
FIG. 13 is a perspective view of a full length big body, full length small body, and mattress cover sewn together as a single, one-piece drop in unit.

Referring now to FIGS. 9-11, the first trim component set 20 of FIG. 2 is illustrated as being supplemented with additional trim components. For example, the first set 20 of casket interior trim components can also include a one-piece small body and foot lining 80 (in substitution for the small body 28), a foot pillow or roll 82, a cap panel insert 84, a pair of longer puffing accents 86, 86, a pair of shorter puffing accents 88, 88, and a comforter 90. A separate small body 28 and a separate foot lining could also be included (in substitution for one-piece small body and foot lining 80). For full top or full couch caskets, the big body 26, one-piece small body and foot lining 80, and mattress cover 22 could be sewn together as a single, one-piece drop in unit 94 (FIG. 12), or a full length big body, full length small body, and mattress cover 22 could be sewn together as a single, one-piece drop in unit 96 (FIG. 13).

Various attachment means as are known in the art can be utilized to attach or fasten the big body, small body, foot lining, one-piece small body and foot lining, mattress cover and pillow cover, such as hook and loop, buttons, snaps, zippers, magnets, and the like. Likewise, various attachment means as are known in the art can be utilized to attach the cap panel accents and puffing accents, such as magnets, hook and loop, double sided tape, press-fit, and the like.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. Accordingly, the scope of the invention shall be limited only by the following claims and their equivalents.

What is claimed is:

1. A method of shipping an untrimmed casket for trimming at a destination comprising:
    packaging each of a plurality of casket interior trim component sets in a respective container, each set of the plurality of sets containing trim components being of a different material, color, or design,
    placing the plurality of containers of casket interior trim component sets in the untrimmed casket, and
    shipping the untrimmed casket with the plurality of containers of casket interior trim component sets therein to the destination.

2. The method of claim 1 wherein the containers are at least in part transparent to permit a purchaser to view the trim components through the container.

3. The method of claim 1 wherein the trim components of each packaged set include at least one component selected from a group consisting of a mattress cover, a pillow cover, a big body, a small body, and an overthrow.

4. The method of claim 3 wherein the trim components of each packaged set further include at least one component selected from a second group consisting of a throw pillow, a cap panel accent, a puffing accent, a comforter, a cap panel, and a foot lining.

5. The method of claim 3 wherein the small body is a one-piece small body and foot lining.

6. The method of claim 3 wherein the big body, small body, and mattress cover are sewn together as a single one-piece unit.

7. The method of claim 1 wherein the trim components of each packaged set include at least two components selected from a group consisting of a mattress cover, a pillow cover, a big body, a small body, and an overthrow.

8. The method of claim 1 wherein the trim components of each packaged set include at least three components selected from a group consisting of a mattress cover, a pillow cover, a big body, a small body, and an overthrow.

9. The method of claim 1 wherein the trim components of each packaged set include at least four components selected from a group consisting of a mattress cover, a pillow cover, a big body, a small body, and an overthrow.

10. The method of claim 1 wherein the trim components of each packaged set comprise a mattress cover, a pillow cover, a big body, a small body, and an overthrow.

* * * * *